(No Model.) 2 Sheets—Sheet 1.
S. C. KENAGA & J. S. BRIGGS.
CORN HARVESTER.
No. 264,709. Patented Sept. 19, 1882.
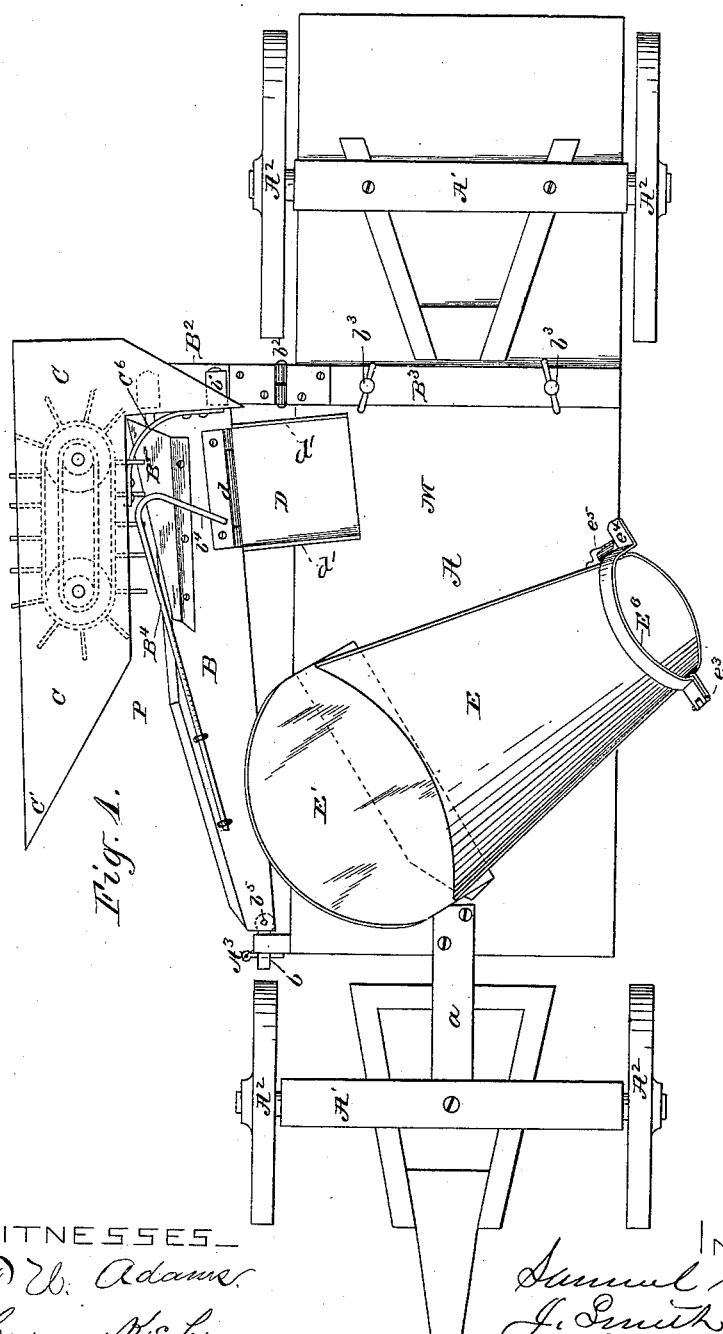
WITNESSES
F. W. Adams
Cyrus Kehr
INVENTORS
Samuel C. Kenaga
J. Smith Briggs
per M. E. Dayton
Attorney (No Model.) 2 Sheets—Sheet 2.
S. C. KENAGA & J. S. BRIGGS.
CORN HARVESTER.
No. 264,709. Patented Sept. 19, 1882.
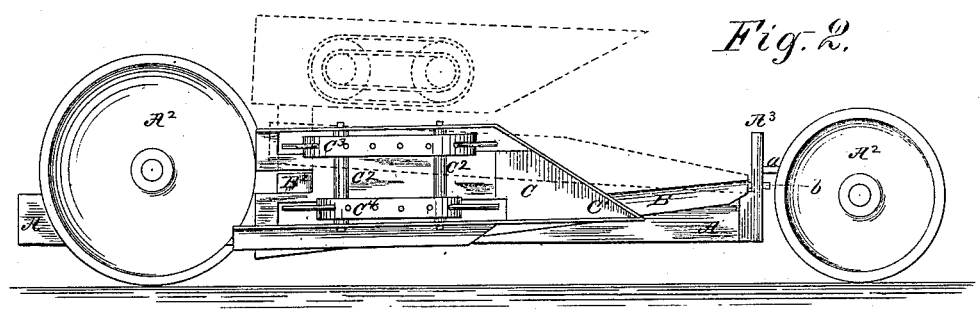
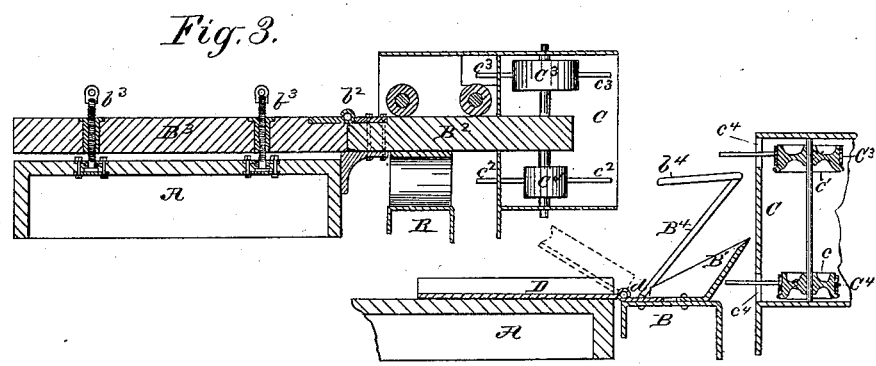
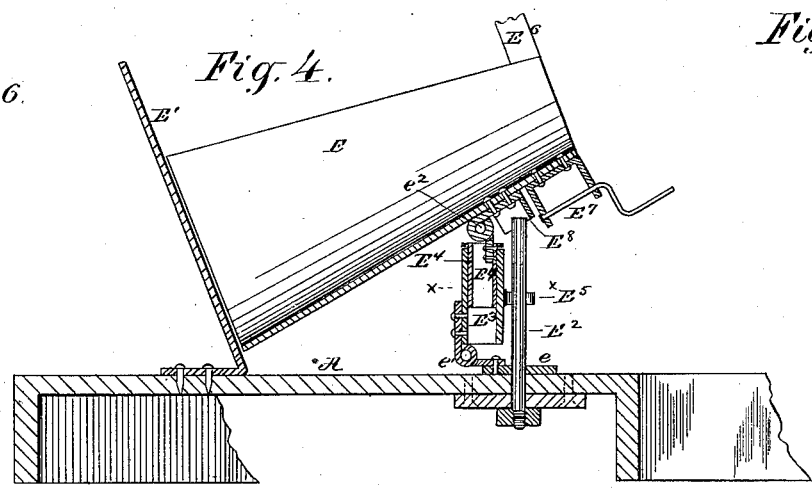
WITNESSES
F. W. Adams.
Cyrus Kohr.
INVENTORS
Samuel C. Kenaga
J. Smith Briggs
per M. E. Dayton
Attorney

UNITED STATES PATENT OFFICE.

SAMUEL C. KENAGA AND J. SMITH BRIGGS, OF KANKAKEE, ILLINOIS, ASSIGNORS OF ONE-FOURTH TO CHARLES H. BRIGGS, OF SAME PLACE.

CORN-HARVESTER.

SPECIFICATION forming part of Letters Patent No. 264,709, dated September 19, 1882.

Application filed March 6, 1882. (No model.)

*To all whom it may concern:*

Be it known that we, SAMUEL C. KENAGA and J. SMITH BRIGGS, both of Kankakee, in the county of Kankakee and State of Illinois, have invented certain new and useful Improvements in Corn-Harvesters; and we do hereby declare that the following is a full, clear, and exact description thereof, reference being had to the accompanying drawings, and to the letters of reference marked thereon, which form a part of this specification.

This invention relates to improvements in corn-harvesting machines of the class which are drawn through the field and sever the standing corn in their passage. Some of the general features of construction herein shown are embraced in a patent granted to one of the present inventors, and said features are not therefore herein claimed.

Our improvements have for their objects, first, to provide an automatic or self-adjusting knife-carrier adapted to follow the rows of standing corn when the implement is not drawn or guided accurately parallel therewith; to provide for vertical adjustment of a knife; to provide a reel or sweep for raising inclined corn, and for carrying the tops of the corn backward, being actuated by the standing corn; to provide a detachable shock-holder; to provide a shock-holder located at the side of the implement and contrived to follow the shock after it has struck the ground, and to provide several other features of improvement that will be hereinafter more fully set forth.

The invention consists in said matters of improvement, as described below and defined in the appended claims.

In the drawings, Figure 1 is a top or plan view of a corn-harvester containing our several improvements. Fig. 2 is a side elevation. Fig. 3 is a vertical transverse section of the machine longitudinally through the hinged bar $B^2 B^3$ of Fig. 1. Fig. 4 is a vertical section through the shock-holder E of Fig. 1, longitudinal of said shock-holder and oblique to the bed A. Fig. 5 is a transverse vertical fragmentary section through the knife-carrier B, the knife B', and the reel-case C of Fig. 1. Fig. 6 is a horizontal section through the line $x\ x$ of Fig. 4.

A is the bed of the implement, mounted on the axles and wheels of a farm-wagon.

B is a knife-carrier mounted movably at the side of the bed A.

C is a frame or case bearing or containing a sweep for carrying the tops of the corn backward, and at its forward end inclined outward to engage the standing corn and direct the same to the knife B'.

E is the shock-holder.

D is a receptacle into which the corn falls when cut.

Heretofore the knife of this class of harvesters, whether it be fixed, rotating, or reciprocating, has been applied to maintain a permanent position relative to the body of the implement, and as a consequence it has been necessary to guide the implement with considerable accuracy parallel or in line with the row of standing corn being cut. This is often difficult, and in order to obviate the necessity of so great care in directing the machine the knife-carrier in our improved machine is made laterally and freely movable, and within the range of its lateral movement it follows and is guided by the standing corn. For this purpose the knife-carrier B is here shown as being provided with a pin or projection, $b$, pivoted to its front end by a joint, $b^5$, which pin passes through a hole in the standard $A^3$, attached to the bed A. On the front side of said standard the projection $b$ receives a pin or nut, $b^6$. At its rear end the part B is shown as provided with wheeled projections $b'$, which travel on the surface of the arm or bar $B^2$, also supported from the bed A.

In order to provide for a vertical adjustment of the knife-carrier, the standard $A^3$ is provided with a series of holes for the admission of the projection $b$, and the arm $B^2$ is capable of being raised and lowered by means of the adjusting-screws $b^3\ b^3$, by which the extension $B^3$ of said arm $B^2$ is secured to the bed A.

In addition to the fixed knife B', secured to the carrier B, said carrier has attached thereto an outer guide, C', (herein forming the forward and inner part of a frame for an additional purpose, as will be explained,) which guide extends outward and forward beyond the row of standing corn. Said carrier B is also preferably inclined outward and backward from its front end, so as to form, with the outer guide, C', a rearwardly-converging passage, P, into which the corn is directed to the knife B' as the machine advances. The carrier, with its attachments, being pivoted at its front end and laterally movable at its rear end, as set forth, it is plain that when the standing corn strikes the inclined face of either guide C' or carrier B instead of the corn being tilted greatly inward or outward, the guides themselves, together with the knife, are laterally swayed into line with the corn. This insures a better delivery of the corn to the knife, a better action of the sweep, if used, and a better disposition of the corn as it falls from the knife after being cut. In addition to the foregoing advantages, it also manifestly lessens the power required to operate the machine and the tendency to pull up the corn, which attends a violent lateral draft thereon.

As a means for giving ease of lateral movement to the knife-carrier B and its attachments, the movable structure B C is provided with roller-projections $b'$, which ride on the upper surface of the arm $B^2$, as clearly seen in Fig. 3. Instead of this device, any form of guide may, however, be used; or the said structure may be suspended by a chain or chains from an elevated arm.

The draft on the cutter is met by the pin or nut $b^6$ at the front end of the knife-carrier B; or it may be met by a roller having a vertical axis interposed between the rear end of the movable part B C and the vertical face of the arm $B^2$. When the supporting-arm $B^2$ is employed said arm may be raised and lowered by means of the adjusting-screws $b^3$, headed in the bed A and screw-threaded through the extension $B^3$ of said arm, as plainly indicated in Fig. 3; or other means may be employed for this purpose. The object attained by such vertical adjustment of the knife-carrier is to enable the operator to cut the corn at any desired distance from the ground, according to the height of the corn, or as may be dictated by other considerations.

The knife B' is preferably of a peculiar character, described and claimed in the other patent referred to, and consists, briefly, of a fixed blade having its cutting-edge rearwardly, outwardly, and upwardly inclined and set at about the inclination from a vertical plane shown in Fig. 3. The heel of the knife reaches or proximates the inner face of the guide C, so that no corn can pass the blade uncut.

An inner guide, $B^4$, rises from the part B in the direction of the knife-edge to hold the corn erect and to direct its top into engagement with the sweep, next to be described.

The part C consists preferably of a shell, case, or housing, in which are mounted two parallel vertical shafts, $C^2 C^2$, opposite the knife B'. Said shafts bear each a lower pulley, $c$, and an upper and larger pulley, $c'$, and on said pulleys are mounted the horizontal belts $C^3$ and $C^4$, as plainly shown in Figs. 2 and 3. Said belts are provided with projecting arms $c^2$ $c^3$, which extend outward through openings $c^4$ in the inner vertical face of the housing in position to engage with the corn being or about to be cut, as shown in Fig. 5. These shafts and belts are driven by the standing corn, which engages with the lower belt projections, $c^2$. The upper pulleys, $c'$, being larger than the lower ones, the upper belt, $C^3$, has greater speed than the lower one, $C^4$, so that the arms $c^3$ serve to sweep the tops of the corn backward. Inclining stalks are thus raised to bear more fairly and favorably against the knife B', and the proper direction is given to the corn in its fall after being cut.

The belts $C^3 C^4$ may be of metal, of sprocket construction, or of rubber, or of any other desired material, having the arms or sweeps $c^2$ $c^3$ thereto attached.

For the purpose of directing the corn crosswise of the machine after being cut, the curved guide $C^6$ is provided, and the rear and upper end, $b^4$, of the guide $B^4$ is also bent inward, as shown in Figs. 1 and 5.

The receptacle D, upon which the cut corn falls, is, as here shown, constructed in the form of a tray, having sides $d'$ $d'$, and hinged to the knife-carrier B, being, therefore, movable therewith. In use said receptacle is usually set at an inclination from the bed A, as shown by dotted lines in Fig. 5. This receptacle is shown fixed and inclined with reference to the similar knife in the before-mentioned Letters Patent.

The cutting devices being arranged at one side of the machine, as shown, it is desirable, when the implement is being drawn to and from the field, that said projecting parts be retracted out of the way. For this purpose the arm $B^2$ is hinged at $b^2$ to its extension $B^3$ at a point over the edge of the bed A, and the receiver D is also hinged to the part B. By this means and the pivotal connection of said part B with the standard $A^3$ the connected parts B C may be tilted upward over the bed and into the position shown in dotted lines of Fig. 2.

The rotating shock-holder E, and the foot-piece E', fixed to the bed A, are in form similar to those shown in the aforesaid patent. In the present instance, however, the holder E is not only mounted to rotate and tilt for the delivery of the shock to the ground, but it is provided with a double tilting movement, by which it may be carried over with the shock to a vertical position, and by which, in the progress of the machine after the shock has struck the ground, the holder may remain with and swing around the standing shock until clear of the same, when it may be again lifted into place on the machine to receive another supply of stalks. Said shock-holder is also wholly movable. These features of construction are the especial subject of illustration in Figs. 4 and 6, as follows:

$E^2$ is a vertical shaft fixed to the bed A. About its base is a plate, $e$, which rotates on said shaft, and preferably rests on the bed or on a suitable shoulder on the shaft. A hinge, $e'$, connects the tube $E^3$ with the plate $e$, and a spring-clamp, $E^5$, or other form of readily detachable fastening holds the tube $E^3$ upright, as shown in Fig. 4. Into the tube $E^3$ drops the shaft or trunnion $E^4$, hinged at $e^2$ to the bottom of the trough E, and adapted to rotate in the tube $E^3$.

$E^8$ is a socket which sets over the upper end of the shaft $E^2$, and thereby, when in this position, enables the operator to turn the plate $e$ with the trough E, instead of simply swinging the said trough on its bearing $E^4$ in the tube $E^3$; but by lifting the socket $E^8$ over and clear of the end of the shaft $E^2$ the shaft $E^4$ may be rotated in the tube $E^3$.

In the use of these devices to discharge a shock, the lower end of the trough is first lifted so as to permit its being swung clear of $E'$ forward and outward over the edge of the bed A. In this movement of the trough the socket $E^8$ engages the shaft $E^2$, and, as before stated, the plate $e$, with its connections, is carried around with the trough. When the foot of the shock is carried well outside the range of the rear wheel, $A^2$, or when the trough is, say, at right angles with the edge of the bed, said trough is let fall or guided to deliver the shock in a standing position on the ground. In this movement the catch $E^5$ is disengaged, which permits the trough to pass with the shock into a vertical position and to strike the ground with the shock. If the machine is continued in forward motion while thus discharging the shock, the trough will remain with and swing about the standing shock until clear of the same by the rotative movement afforded by the plate $e$ on the shaft $E^2$, after which it may be lifted again into place to receive another load. If the machine be stopped while a shock is being delivered, the movements, provided as described, permit the shock to be set up as carefully as may be desired and the trough to be then withdrawn therefrom and replaced as before.

$E^6$ is a metal band, hinged at one side of the trough near its smaller end, and extending over the other side, where its end $e^4$ is bent outward at a right angle. Here a fixed plate, $e^5$, is provided on the trough, having a series of notches, with which the projecting end $e^4$ engages. Thus the band $E^6$ forms a clamp or temporary binder adapted to confine the corn tops closely preparatory to binding and discharging the shock.

The shock-holder is shown as being detachable by lifting the trunnion $E^4$ out of its bearing in $E^3$; but this feature is not essential to the operation of the remaining parts, as described.

We claim as our invention—

1. In a corn-harvester, the combination, with a wheel-supported bed, of a cutting mechanism embracing a knife and an opposing-guide bearing a fixed relation to the knife, said cutting mechanism being laterally self-adjusting to the position of the corn to be cut, substantially as described.

2. In combination with the wheel-supported bed A, the knife-carrier B, provided with an outer guide, said carrier being flexibly connected at its front end with the bed and supported so as to be laterally movable at its rear end by engagement with the standing corn, substantially as described.

3. In combination with the wheel-supported bed, the knife and its guides, connected with each other and together adjustable vertically with reference to the bed, substantially as described.

4. In combination with the laterally-projecting knife-carrier and its necessary guiding and cutting attachments, pivotally secured at its front end to the bed, an arm, $B^2$, arranged to support the rear end of the projecting structure and jointed at $b^2$, substantially as described.

5. In a corn-harvester, the combination, with a knife, $B'$, of sweeps $c^3$, arranged to carry backward the corn-tops, and mechanism engaging with the lower portion of the standing corn, substantially as described, and for the purposes set forth.

6. In combination with the knife of a corn-harvester, the upright shafts $C^2 C^2$, provided with lower and upper pulleys, $c$ and $c'$, of which the upper ones are the larger, and the belts $C^3 C^4$, carried by said pulleys, and provided with projecting arms $c^2 c^3$, arranged and operated substantially as and for the purposes set forth.

7. The hinged receptacle D, in combination with the laterally-movable knife-carrier B and bed A, substantially as described.

8. In combination with the laterally-projecting and independently-movable cutting-structure of a corn-harvester, a supporting-arm, $B^2 B^3$, having vertically-adjustable connection with the bed A, substantially as described.

9. In combination with the cutter and upper and lower sweeps, having unequal speeds, the guide $B^4$, for holding the corn in engagement with the upper sweep, substantially as described.

10. The combination, with the bed A of a corn-harvester, of the shock-holder arranged to deliver at the side of the bed, and adapted to follow the shock to the ground in a vertical position, and to recede with and rotate about the standing shock in the advance of the bed until clear of the shock, substantially as described.

11. In combination with the bed A and shock-holder E, the shaft $E^2$, rotating plate $e$, socket $E^3$, hinged to the plate $e$, and provided with the detachable fastening $E^5$, the trunnion $E^4$, hinged to the holder E, and the part $E^8$, arranged to engage the top of the shaft $E^2$, together arranged and operating substantially as described.

In testimony that we claim the foregoing as our joint invention we affix our signatures in presence of two witnesses.

SAMUEL C. KENAGA.
J. SMITH BRIGGS.

Witnesses:
WARREN R. HICKOX,
C. FRED WHITMORE.